G. W. BRUBAKER, Jr.
CLUTCH.
APPLICATION FILED MAR. 16, 1909.

941,973.

Patented Nov. 30, 1909.

Witnesses

Inventor
George W. Brubaker, Jr.,
By C. A. Snow & Co.
Attorneys

UNITED STATES PATENT OFFICE.

GEORGE W. BRUBAKER, JR., OF LOUDONVILLE, OHIO.

CLUTCH.

941,973. Specification of Letters Patent. Patented Nov. 30, 1909.

Application filed March 16, 1909. Serial No. 483,728.

*To all whom it may concern:*

Be it known that I, GEORGE W. BRUBAKER, Jr., a citizen of the United States, residing at Loudonville, in the county of Ashland and State of Ohio, have invented a new and useful Clutch, of which the following is a specification.

It is the object of the present invention to provide an improved construction of clutch which is designed for use under conditions such as for example upon a potato digger, cotton chopper, planter, or other agricultural machine wherein the chopping, planting, or other operating mechanism is actuated by power transmission from one of the ground wheels of the machine.

When the machine is traveling over a field and is in actual use, it is of course necessary that the power transmission mechanism be clutched with the ground wheel in some manner so that upon rotation of the wheel due to travel of the machine over the field, the mechanism will be actuated, but when transporting the machine from place to place such for example as from one field to another or over uneven and rocky roads, it is undesirable that the planting, chopping, or other mechanism thereof be in operation and it is therefore expedient that some means be provided for disconnecting the power transmission mechanism from the ground wheel.

The present invention contemplates the provision of a clutch which is desired particularly for use in the relation stated, and which will be extremely simple in its construction and easy to manipulate, the employment of heavy and bulky levers, segments, and the like for actuating a clutch device being obviated.

Figure 1:
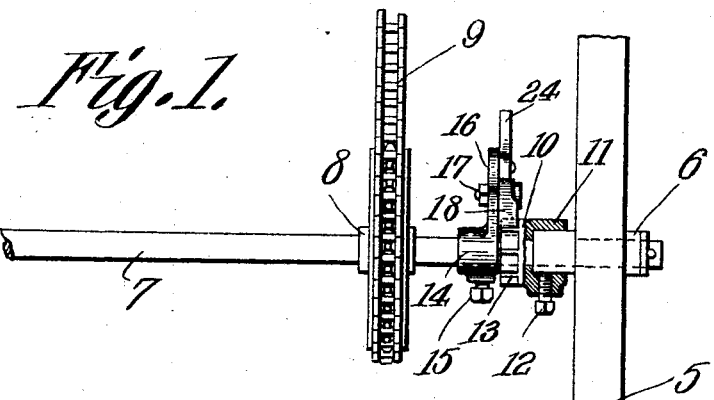
Figure 2:
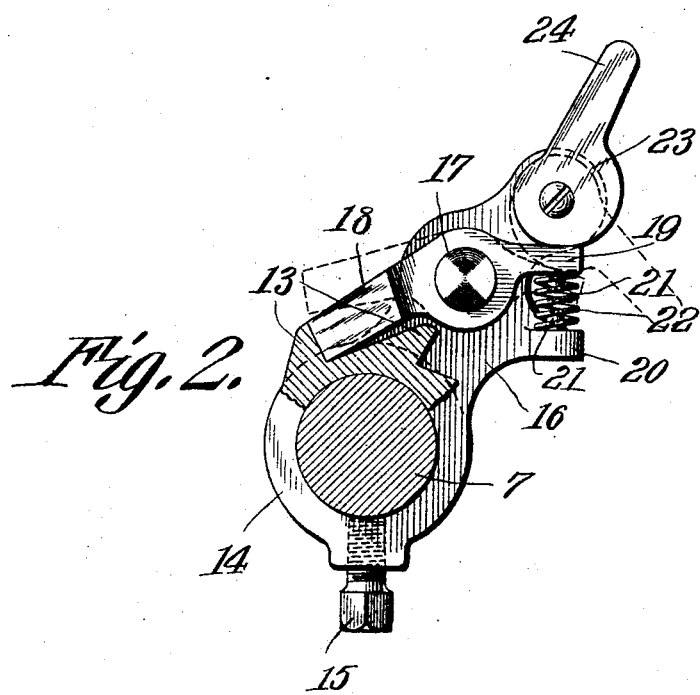

In the accompanying drawings, Figure 1 is a view in rear elevation of the ground wheel and a portion of the axle of an agricultural machine showing the application of the clutch embodying the invention, thereto. Fig. 2 is a detail view partly in side elevation and partly in section of the clutch embodying the invention, the shaft or axle of the machine being shown in transverse section.

In the drawings, one of the ground wheels of the machine is indicated by the numeral 5 and the hub thereof by the numeral 6, the hub loosely receiving one end of an axle or shaft 7 upon which the wheel may freely rotate or which may be clutched to rotate with the wheel through the medium of the clutch device embodying the invention. The wheel, its hub, and the axle are clearly shown in Fig. 1 of the drawings and in this figure there is shown, fixed upon the axle or shaft 7, a sprocket gear 8 around which is trained a sprocket chain 9 which may lead to a second sprocket gear associated with the chopping, planting, or other mechanism which may determine the character of the machine.

As shown in the drawings, the clutch embodying the invention consists, broadly speaking, of two clutch members one of these members being indicated by the numeral 10 and being formed with an integral collar and sleeve portion 11 which receives the inner end of the hub 6 and is held in place thereon by means of a suitable set or securing screw 12 engaged therethrough and bearing at its end against the said end of the hub. The member 10 of the clutch is formed or provided with ratchet teeth 13 which perform a function to be presently stated. The other member of the clutch comprises a collar portion 14 which is fitted upon the shaft or axle 7 of the machine and is held in place thereon and at the proper adjustment with respect to the member 10 of the clutch by means of a suitable set screw 15 which is threaded therethrough and bears against the axle. The collar portion 14 of the said clutch member is formed with a radially directed wing or web 16 upon which is pivoted, as at 17, a pawl 18 which is adapted to coöperate with the teeth 13 by engaging at its ends with the abrupt faces of the said teeth. This pawl 18 is provided, at that side of its pivot 17 opposite the side at which its tooth 18 is located, with a lug 19 which has one face presented toward a lug 20 formed upon that face of the web 16 upon which the pawl is pivoted. The lugs 19 and 20 are formed upon their opposing faces, each with a stud 21 and disposed between the said opposing faces of the lugs and engaging at its ends with the studs whereby to obviate its displacement, is a spring 22 the normal tendency of which is to hold the tooth 18 of the pawl in engagement with the teeth 13 of the first mentioned clutch member. Also pivoted upon the web 16 and to the same side thereof as the pawl 18 is a cam 23 having a grip or handle extension 24 which may be grasped for the purpose of rotating the cam to cause it to perform a function to be presently described.

As is clearly shown in Fig. 2 of the drawings, the cam 23, regardless of the position which it may be caused to assume, is engaged at some point in its cam edge, at all times, by that face of the lug 19 upon the pawl 18 opposite to the face upon which the stud 21 is formed so that the action of the spring in holding and tending to move the pawl with its tooth in engagement with the teeth 13 of the first described clutch member, is limited according to the position of the cam 23 so that if this cam is moved to the position shown in full lines in the said Fig. 2 of the drawings, the pawl will be free to coöperate with the teeth of the clutch member first described, whereas if rotated to the position shown in dotted lines in the said figure, the lug end 19 of the pawl will be depressed thereby swinging its tooth 18 out of position for engagement or coöperation with the said teeth 13 of the first described clutch member, this latter movement of the pawl being of course against the tension of the spring 22.

From the foregoing description of the invention, it will be understood that when the machine is in actual use, the cam 23 is to be in the position shown in full lines in Fig. 2 of the drawings, or nearly in this position, or in other words in such position that the tooth 18 of the pawl will be free to coöperate with the teeth 13 of the clutch member which is carried by the hub of the wheel 5 so that upon forward travel of the machine, the shaft 7 will be rotated with the wheel and as a result, the mechanism of the machine will be driven through the medium of this shaft, the sprocket gear 8, and the sprocket chain 9, to perform its function.

On the other hand, when the machine is being moved from one field to another or along roads which are uneven and where there is really no necessity for operation of the mechanism, the cam 23 is rotated to the position shown in dotted lines in the said Fig. 2 of the drawings, whereby the lug end 19 of the pawl will be depressed as just described and its toothed end raised so that the wheel 5 will be free to rotate upon the shaft or axle 7 and the said shaft will therefore not have rotative movement to actuate the mechanism of the machine.

What is claimed is:—

In a clutch, coöperating clutch members, one of said members comprising a collar having a web portion, the other member comprising a ratchet and being disposed against one end of the collar of the first mentioned member, the said web of the first mentioned member being formed with a lateral lug, a pawl pivoted upon the web and engaging at one end with the ratchet and having its other end at the other side of the pivot projecting above the lug upon the web, a spring interposed between the lug and the last mentioned end of the pawl and tending to hold the first mentioned end of the pawl in engagement with the ratchet, and a cam pivoted upon the web directly above the spring engaged end of the pawl and movable to position to disengage the other end of the pawl from the ratchet and to hold the same so disengaged.

In testimony that I claim the foregoing as my own, I have hereto affixed my signature in the presence of two witnesses.

GEORGE W. BRUBAKER, Jr.

Witnesses:
　EMILY C. SANBORN,
　E. C. KIPLINGER.